(12) United States Patent
Singh

(10) Patent No.: US 10,636,331 B1
(45) Date of Patent: Apr. 28, 2020

(54) AUDIO ELECTRONIC LABELLING SYSTEM

(71) Applicant: NAFFA INNOVATIONS PRIVATE LIMITED, Bengaluru (IN)

(72) Inventor: Vivek Kumar Singh, Bengaluru (IN)

(73) Assignee: NAFFA INNOVATIONS PRIVATE LIMITED, Karnataka (IN)

( * ) Notice: Subject to any disclaimer, the term of this patent is extended or adjusted under 35 U.S.C. 154(b) by 0 days.

(21) Appl. No.: 16/507,455

(22) Filed: Jul. 10, 2019

(30) Foreign Application Priority Data

May 15, 2019 (IN) .............................. 201941019278

(51) Int. Cl.
*G07B 15/02* (2011.01)
*G09F 3/20* (2006.01)
*G06Q 20/20* (2012.01)
*G09F 27/00* (2006.01)
*G06Q 30/06* (2012.01)

(52) U.S. Cl.
CPC ........... *G09F 3/208* (2013.01); *G06Q 20/201* (2013.01); *G06Q 30/0633* (2013.01); *G09F 27/00* (2013.01); *G09F 2027/002* (2013.01)

(58) Field of Classification Search
CPC .... G09F 3/208; G09F 27/00; G09F 2027/002; G06Q 20/201; G06Q 30/0633
USPC ......................................... 235/384, 380, 375
See application file for complete search history.

(56) References Cited

U.S. PATENT DOCUMENTS

2015/0134429 A1* 5/2015 Katakwar .......... G06Q 30/0207
705/14.1

* cited by examiner

*Primary Examiner* — Karl D Frech
(74) *Attorney, Agent, or Firm* — Barry Choobin; Patent 360 LLC

(57) ABSTRACT

The embodiments herein provide an audio electronic shelf label (AESL) configured for providing information related to a product associated with the audio electronic shelf label. The AESL comprises a communication interface for communicating information related to the AESL; a control unit coupled to the communication interface and an audio interface unit coupled to the control unit. The control unit is configured for processing the information related to the AESL. The audio interface unit is configured for generating audio signals encoded with a characteristic audio tag upon receiving an indication from a user device.

14 Claims, 1 Drawing Sheet

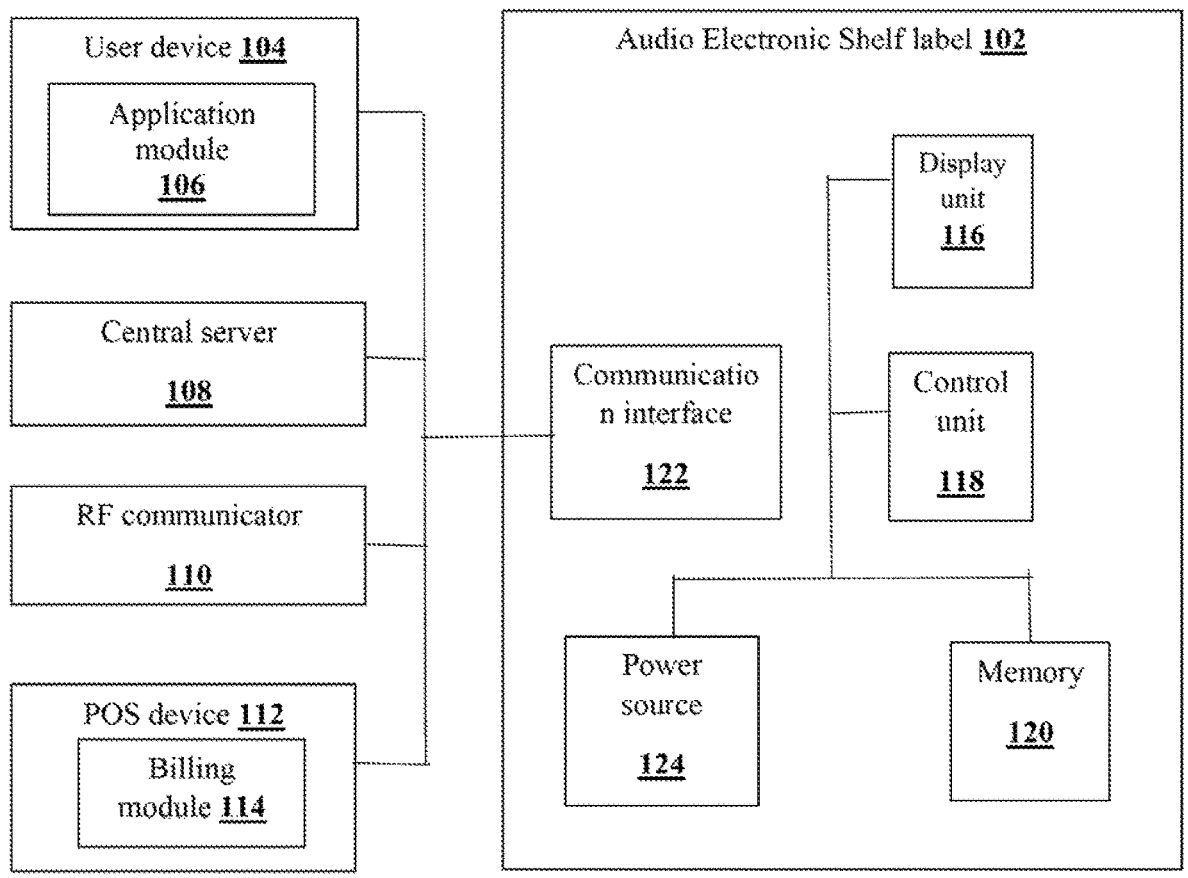

AUDIO ELECTRONIC LABELLING SYSTEM

CROSS-REFERENCE TO RELATED APPLICATIONS

The embodiments herein claim the priority of the Indian Non-Provisional Patent Application No. 201941019278 titled "AUDIO ELECTRONIC LABELLNG SYSTEM", filed on May 15, 2019 and the contents of which are incorporated in entirety by the way of reference.

BACKGROUND

Technical Field

The embodiments herein are related to labeling system for goods and products. The embodiments herein are particularly related to a system and method for providing product information to consumers through tags or labels. The embodiments herein are more particularly related to an electronic audio (audio card) label which is attached to goods and shelf and which is wirelessly connected to an electronic labelling system.

Description of Related Art

Electronic labelling systems are well known and the electronic labelling system comprises electronic labels that are placed on shelves, for example, in grocery stores, to serve as price tags. The information displayed on the labels are updated from a central server unit communicating with the labels via wired or wireless communication.

Each label comprises several registers, or pages and one of which is displayed at any given time. The information to display is controlled from the central unit, or from handheld devices used by the staff locally.

In addition to displaying price information, the labels are configured to save and display or notify other types of valuable information of interest such as special offers, the number of items of a particular product still available in stock, inventory of the product, the expected number of merchandise on the shelf, space management information, etc. Normally, however, the price information is displayed.

However, such electronic shelf labels are employed merely for displaying product information to a user and do not facilitate seamless addition of the product into the virtual cart of the user.

Hence, there exists a need for an electronic audio shelf label to facilitate seamless selection and/or deselection of the product into the virtual cart of the user thereby enhancing shopping experience for the user.

The abovementioned shortcomings, disadvantages and problems are addressed herein, which will be understood by reading and studying the following specification.

OBJECTIVES OF THE EMBODIMENTS HEREIN

The primary object of the embodiments herein is to effectively solve the above-mentioned issues of the technology of electronic shelf labels.

Another object of the embodiments herein is to provide an audio electronic labelling system that facilitates seamless addition and/or deletion of a product associated with the Audio Electronic Shelf Label (AESL) into a virtual shopping cart of the user.

Yet another object of the embodiments herein is to provide a seamless shopping experience for the user.

Yet another object of the embodiments herein is to provide a flexibility of building Audio TAG on both Flexible and rigid Printed Circuit Board (PCB).

Yet another object of the embodiments herein is to provide an audio electronic labelling system that facilitates change in the light frequency to trigger a software development kit (SDK) to generate a Tone that is captured by customer appliance/application, When a user taps on the AESL.

Yet another object of the embodiments herein is to provide an audio electronic labelling system that facilitates AESL to enable user to interact and make purchase from aisle itself by using voice/audio thereby making the process extremely simple for any consumer to either interact with AESL using their phone or voice.

These and other objects and advantages of the embodiments herein will become readily apparent from the following detailed description taken in conjunction with the accompanying drawings.

SUMMARY

The various embodiments herein provide an audio electronic labelling system that is communicatively coupled to multiple AESLs that not only display information related to an associated product but also facilitate addition and/or deletion of the product associated with the AESL into the virtual cart of the user.

The embodiments herein provide an audio electronic labelling system comprising an audio electronic shelf label configured for providing information related to a product associated with the audio electronic shelf label (AESL) and a control unit coupled to the communication interface and wherein the control unit is configured for processing the information related to the AESL. A central server is communicatively coupled to the audio electronic shelf label, and wherein the central server is configured for controlling an operation of the AESL. An application module is installed on a user device associated with a user, and wherein the application module is configured for interfacing the user with the AESL. A billing module is installed on a POS device, and wherein the billing module is configured for generating a virtual cart associated with the user. A radio frequency communicator is communicatively coupled to the AESL, the billing module and the central server, and wherein the radio frequency communicator is configured for routing information related to the AESL to the central server. The AESL comprises a communication interface for communicating information related to the AESL, a control unit coupled to the communication interface and wherein the control unit is configured for processing the information related to the AESL and an audio interface unit coupled to the control unit. The audio interface unit is configured for generating audio signals encoded with a characteristic audio tag upon receiving an indication from a user device.

According to one embodiment herein, an audio electronic shelf label is configured for providing information related to a product associated with the audio electronic shelf label. The AESL comprises a communication interface for communicating information related to the AESL, a control unit coupled to the communication interface and wherein the control unit is configured for processing the information related to the AESL and an audio interface unit coupled to the control unit. The audio interface unit is configured for generating audio signals encoded with a characteristic audio tag upon receiving an indication from a user device.

According to one embodiment herein, an audio electronic labelling system is provided. The audio electronic labelling system comprises an Audio Electronic Shelf Label (AESL) configured for providing information related to a product associated with the audio electronic shelf label. The AESL comprises a communication interface for communicating information related to the AESL. A control unit is coupled to the communication interface and the control unit is configured for processing the information related to the AESL. A central server is communicatively coupled to the audio electronic shelf label, and the central server is configured for controlling an operation of the AESL. An application module is installed on a user device associated with a user, and the application module is configured for interfacing the user with the AESL. A billing module is installed on a POS device provided at a departmental store, and the billing module is configured for generating a virtual cart associated with the user. A radio frequency communicator is communicatively coupled to the AESL, the billing module and the central server. The radio frequency communicator is configured for routing an information related to the AESL to the central server. The audio electronic shelf label comprises an audio interface unit coupled to the control unit, and the audio interface unit is configured for generating audio signals encoded with a characteristic audio tag upon receiving an indication from a user device.

According to one embodiment herein, the AESL further comprises a display unit for displaying information related to the product associated with the audio electronic shelf label.

According to one embodiment herein, the AESL further comprises a power source configured for supplying power to one or more components of the AESL.

According to one embodiment herein, the AESL further comprises a memory configured for storing information about the product associated with the AESL.

According to one embodiment herein, the central server is configured for allocating an authentication code upon activating the application module installed on the user device.

According to one embodiment herein, the memory is configured to store an authentication code.

According to one embodiment herein, the control unit is configured for matching the authorization code provided by the user device with the authorization code stored in the memory of the AESL, and upon successful matching, the AESL is configured to transmit identity information, price information or information related to the product, to the user device.

According to one embodiment herein, the communication interface is configured to receive a new authorization code matching an authorization code in the label to replace an old authorization code.

According to one embodiment herein, An Audio Electronic Shelf Label (AESL) is developed and designed for providing information related to a product associated with the audio electronic shelf label. The AESL comprises a communication interface for communicating information related to the AESL. The control unit is coupled to the communication interface, and the control unit is configured for processing the information related to the AESL. An audio interface unit is coupled to the control unit, and the audio interface unit is configured for generating audio signals encoded with a characteristic audio tag upon receiving an indication from a user device.

According to one embodiment herein, the AESL further comprises a communication interface and wherein the communication interface is configured to be communicatively coupled to a central server, and wherein the central server is configured for controlling an operation of the AESL.

According to one embodiment herein, the communication interface is configured to be communicatively coupled to an application module installed on a user device associated with a user, and wherein the application module is configured for interfacing the user with the AESL.

According to one embodiment herein, the communication interface is configured to be communicatively coupled to a billing module installed on a POS device, and wherein the billing module is configured for generating a virtual cart associated with the user.

According to one embodiment herein, the communication interface is configured to be communicatively coupled to a radio frequency communicator configured for routing information related to the AESL to the central server.

According to one embodiment herein, the AESL further comprises a display unit for displaying information related to the product associated with the audio electronic shelf label.

According to one embodiment herein, the AESL further comprises a power source configured for supplying power to one or more components of the AESL.

According to one embodiment herein, the AESL further comprises a memory configured for storing information about the product associated with the AESL.

According to one embodiment herein, the memory is configured for storing an authentication code, and wherein the central server is configured for allocating an authentication code upon activating the application module installed on the user device.

According to one embodiment herein, the control unit is configured for matching the authorization code provided by the user device with the authorization code stored in the memory, and upon successful matching. The communication interface is configured to transmit identity information, price information or information related to the product, to the user device.

According to one embodiment herein, a flexibility of building Audio TAG on both Flexible and rigid Printed Circuit Board (PCB).

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 1 illustrates a block diagram of an audio electronic labelling system, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide an audio electronic labelling system that facilitates addition and/or deletion of a product associated with the AESL into the virtual cart of the user thereby enhancing shopping experience for the user.

The embodiments herein provide an audio electronic labelling system comprising an audio electronic shelf label configured for providing information related to a product associated with the audio electronic shelf label (AESL) and a control unit coupled to the communication interface and wherein the control unit is configured for processing the information related to the AESL. A central server is communicatively coupled to the audio electronic shelf label, and wherein the central server is configured for controlling an operation of the AESL. An application module is installed on a user device associated with a user, and wherein the application module is configured for interfacing the user with the AESL. A billing module is installed on a POS device, and wherein the billing module is configured for generating a virtual cart associated with the user. A radio frequency communicator is communicatively coupled to the AESL, the billing module and the central server, and wherein the radio frequency communicator is configured for routing information related to the AESL to the central server. The AESL comprises a communication interface for communicating information related to the AESL, a control unit coupled to the communication interface and wherein the control unit is configured for processing the information related to the AESL and an audio interface unit coupled to the control unit. The audio interface unit is configured for generating audio signals encoded with a characteristic audio tag upon receiving an indication from a user device.

According to one embodiment herein, an audio electronic shelf label is configured for providing information related to a product associated with the audio electronic shelf label. The AESL comprises a communication interface for communicating information related to the AESL, a control unit coupled to the communication interface and wherein the control unit is configured for processing the information related to the AESL and an audio interface unit coupled to the control unit. The audio interface unit is configured for generating audio signals encoded with a characteristic audio tag upon receiving an indication from a user device.

According to one embodiment herein, an audio electronic labelling system is provided. The audio electronic labelling system comprises an Audio Electronic Shelf Label (AESL) configured for providing information related to a product associated with the audio electronic shelf label. The AESL comprises a communication interface for communicating information related to the AESL. A control unit is coupled to the communication interface and the control unit is configured for processing the information related to the AESL. A central server is communicatively coupled to the audio electronic shelf label, and the central server is configured for controlling an operation of the AESL. An application module is installed on a user device associated with a user, and the application module is configured for interfacing the user with the AESL. A billing module is installed on a POS device provided at a departmental store, and the billing module is configured for generating a virtual cart associated with the user. A radio frequency communicator is communicatively coupled to the AESL, the billing module and the central server. The radio frequency communicator is configured for routing an information related to the AESL to the central server. The audio electronic shelf label comprises an audio interface unit coupled to the control unit, and the audio interface unit is configured for generating audio signals encoded with a characteristic audio tag upon receiving an indication from a user device.

According to one embodiment herein, the AESL further comprises a display unit for displaying information related to the product associated with the audio electronic shelf label.

According to one embodiment herein, the AESL further comprises a power source configured for supplying power to one or more components of the AESL.

According to one embodiment herein, the AESL further comprises a memory configured for storing information about the product associated with the AESL.

According to one embodiment herein, the central server is configured for allocating an authentication code upon activating the application module installed on the user device.

According to one embodiment herein, the memory is configured to store an authentication code.

According to one embodiment herein, the control unit is configured for matching the authorization code provided by the user device with the authorization code stored in the memory of the AESL, and upon successful matching, the AESL is configured to transmit identity information, price information or information related to the product, to the user device.

According to one embodiment herein, the communication interface is configured to receive a new authorization code matching an authorization code in the label to replace an old authorization code.

According to one embodiment herein, An Audio Electronic Shelf Label (AESL) is developed and designed for providing information related to a product associated with the audio electronic shelf label. The AESL comprises a communication interface for communicating information related to the AESL. The control unit is coupled to the communication interface, and the control unit is configured for processing the information related to the AESL. An audio interface unit is coupled to the control unit, and the audio interface unit is configured for generating audio signals encoded with a characteristic audio tag upon receiving an indication from a user device.

According to one embodiment herein, the AESL further comprises a communication interface and wherein the communication interface is configured to be communicatively coupled to a central server, and wherein the central server is configured for controlling an operation of the AESL.

According to one embodiment herein, the communication interface is configured to be communicatively coupled to an application module installed on a user device associated with a user, and wherein the application module is configured for interfacing the user with the AESL.

According to one embodiment herein, the communication interface is configured to be communicatively coupled to a billing module installed on a POS device, and wherein the billing module is configured for generating a virtual cart associated with the user.

According to one embodiment herein, the communication interface is configured to be communicatively coupled to a radio frequency communicator configured for routing information related to the AESL to the central server.

According to one embodiment herein, the AESL further comprises a display unit for displaying information related to the product associated with the audio electronic shelf label.

According to one embodiment herein, the AESL further comprises a power source configured for supplying power to one or more components of the AESL.

According to one embodiment herein, the AESL further comprises a memory configured for storing information about the product associated with the AESL.

According to one embodiment herein, the memory is configured for storing an authentication code, and wherein the central server is configured for allocating an authentication code upon activating the application module installed on the user device.

According to one embodiment herein, the control unit is configured for matching the authorization code provided by the user device with the authorization code stored in the memory, and upon successful matching. The communication interface is configured to transmit identity information, price information or information related to the product, to the user device.

FIG. 1 illustrates a block diagram of an audio electronic labelling system, according to one embodiment herein. With respect to FIG. 1, an audio electronic labelling system comprises an audio electronic shelf label configured for providing information related to a product associated with the audio electronic shelf label, a control unit coupled to the communication interface, the control unit configured for processing the information related to the AESL, a central server communicatively coupled to the audio electronic shelf label, the central server configured for controlling operation of the AESL, an application module installed on a user device associated with a user, the application module configured for interfacing the user with the AESL, a billing module installed on a POS device, the billing module configured for generating a virtual cart associated with the user and a radio frequency communicator communicatively coupled to the AESL, the billing module and the central server, the radio frequency communicator configured for routing information related to the AESL to the central server.

According to one embodiment herein, the RF communicator comprises any necessary circuitry, logic, and software/firmware for wireless communication using any of, for example, the cellular, Bluetooth, Wi-Fi (e.g., IEEE 802.11 a/b/g/n/ac), Zigbee, WiMAX, Near Field Communication (NFC), radio frequency identifier (RFID), or any other wireless network air interface standard known now or in the future.

According to one embodiment herein, the central server is configured for simultaneous communication with a plurality of audio electronic shelf labels located in close proximity. The central server is also configured to send other types of information to the label, for example, to update information stored in the label, or to shut down the label.

According to one embodiment herein, the central server is connected, wirelessly or by cable, to at least one transceiver that is adapted to receive and transmit data wirelessly to and from a plurality of AESL.

The embodiments herein provide an audio electronic shelf label for use in an central server for providing information, for example, about the price of a product in a shop, said electronic shelf label being arranged to display said information in the form of characters. The AESL comprises a communication interface for communicating with an central server, preferably through a wireless connection.

According to one embodiment herein, an audio electronic shelf label is configured for providing information related to a product associated with the audio electronic shelf label. The AESL comprises a communication interface for communicating information related to the AESL, a control unit coupled to the communication interface, and wherein the control unit is configured for processing the information related to the AESL and an audio interface unit coupled to the control unit. The audio interface unit is configured for generating audio signals encoded with a characteristic audio tag upon receiving an indication from a user device.

According to one embodiment herein, the control unit is preferably arranged to process update information received from the central server or from a user device and store at least part of the information in more than one of the registers in the memory. The control unit is configured to receive and act on commands and information received, in ways well known to the skilled person. The control unit is configured to be a part of an Application Specific Integrated Circuit (ASIC) including all memory and processing functions needed in the label. Alternatively, the control unit is a microprocessor, which may be relatively simple.

According to one embodiment herein, the control unit further comprises a processing means connected to the communication interface. This processing means is adapted to process the received information and relate this to the image displayed on the dot matrix display. This image is also stored in a storing means connected to the processing means. The processing means is adapted to store the received updated information in the correct position of the image in the storing means.

According to one embodiment herein, the communication interface comprises a transmitter and a receiver or a transceiver unit, to enable two-way communication. The transceiver unit is any one of an IR transceiver or an RF transceiver.

According to one embodiment herein, the communication interface is adapted to receive updated information from the central unit and also positioning information for displaying the updated information in the display unit. The updated information is usually a new price for the product related to this specific price label but it includes other kinds of product information that is updated.

According to one embodiment herein, the AESL further comprises a display unit for displaying information related to the product associated with the audio electronic shelf label. The information to be displayed on the display unit is stored in the memory. The control unit is also configured to control the update of the memory using information received through the communication interface. The display unit comprises any one of a seven segment LED display and a dot matrix display.

According to one embodiment herein, the AESL further comprises a power source configured for supplying power to one or more components of the AESL. The control unit preferably controls a DC/DC converter arranged to convert the voltage supplied by the power source to a sufficiently high voltage to update the display.

According to one embodiment herein, the AESL further comprises a memory configured for storing information about the product associated with the AESL. The memory is designed to hold information such as authorization codes. When the authorization code provided by the user device does not match the authorization code held in the label, the desired information is not displayed. Upon successful matching of the authentication code, the AESL is configured to transmit its own identity information, price information or information related to the product, to the user device.

According to one embodiment herein, the authorization code is a one time password.

According to one embodiment herein, the control unit is coupled to the audio interface unit, which comprises any necessary circuitry, logic, and software to interface a microphone to the AESL. The audio interface unit is encoded with a characteristic audio tag such as a proprietary audio tag by using a proprietary audio library. Accordingly, the received information is decoded by the control unit to obtain the preset audio data using the proprietary library.

According to one embodiment herein, the user device is configured to transmit the identity to the AESL through a wireless connection to the communication interface for identification.

According to one embodiment herein, the user device is tapped to generate sound and send product information to the user device and subsequently the product is added to his/her cart.

According to one embodiment herein, AESL is alternatively configured to send product and pricing information to the RF coordinator and accordingly update user's cart generated at the billing module.

According to one embodiment herein, an item is added or deleted from the cart by operating various buttons provided on the user device. According to one embodiment herein, the buttons such as "up", "down", "+", "−" is employed/configured to enter or alter the product quantity. The button '+' is pressed to indicate that the item is added to the shopping basket and the price is to be added to the sum and the button '−' to indicate that the item is taken out of the shopping basket and the price is to be deducted from the sum. The billing module is configured to add or subtract the price accordingly.

According to one embodiment herein, the billing module is configured to store at least the sum of all purchases made by the client, and the control unit is configured to add for each new item selected by a user (either by tapping the AESL or by selection mad using the handheld device) the price of the item to the total sum. A list of items selected and their price is preferably included.

According to one embodiment herein, the selection of actions to be taken in response to the command is made during a linking process, when the electronic shelf label is connected in a database to a product item, or it is preloaded during manufacturing. Alternatively it is changed at any time by a command from the central server.

According to one embodiment herein, the central server is configured for allocating an authentication code upon activating the application module installed on the user device. The memory is configured to store an authentication code. The control unit is configured for matching the authorization code provided by the user device with the authorization code stored in the memory of the AESL, and upon successful matching, the AESL is configured to transmit identity information, price information or information related to the product, to the user device.

According to one embodiment herein, the communication interface is configured to receive a new authorization code matching an authorization code in the label to replace an old authorization code.

According to one embodiment herein, an audio electronic shelf label configured for providing information related to a product associated with the audio electronic shelf label is disclosed. The AESL comprises a communication interface for communicating information related to the AESL, a control unit coupled to the communication interface and wherein the control unit is configured for processing the information related to the AESL and an audio interface unit coupled to the control unit. The audio interface unit is configured for generating audio signals encoded with a characteristic audio tag upon receiving an indication from a user device.

In addition, the embodiments are implemented by hardware, software, firmware, middleware, microcode, or any combination thereof. When implemented in software, firmware, middleware or microcode, the program code or code segments to perform the necessary tasks may be stored in a machine readable medium such as storage medium or in a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The embodiments herein, provide one or more of the following advantages. Use of audio electronic labelling system provides a seamless shopping experience for a user by facilitating easy addition and/or deletion od a product associated with the AESL into the virtual cart of the user.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:
1. An audio electronic labeling system comprising:
an Audio Electronic Label (AESL) configured for providing information related to a product associated with the audio electronic shelf label, the AESL comprising:
a communication interface for communicating information related to the AESL;

a control unit coupled to the communication interface, and wherein the control unit is configured for processing the information related to the AESL;

a central server communicatively coupled to the audio electronic shelf label, and wherein the central server is configured for controlling an operation of the AESL;

an application module installed on a user device associated with a user, and wherein the application module is configured for interfacing the user with the AESL, and wherein the central server is configured for allocating an authentication code upon activating the application module installed on the user device;

a billing module installed on a POS device, and wherein the billing module is configured for generating a virtual cart associated with the user; and a radio frequency communicator communicatively coupled to the AESL, the billing module and the central server, and wherein the radio frequency communicator is configured for routing an information related to the AESL to the central server;

wherein the audio electronic shelf label comprises an audio interface unit coupled to the control unit, and wherein the audio interface unit is configured for generating audio signals encoded with a characteristic audio tag upon receiving an indication from a user device, and wherein the audio interface unit is encoded with a characteristic audio tag (a proprietary audio tag) by using a proprietary audio library, and wherein the control unit is configured to decode received information to obtain the preset audio data using the proprietary library, and wherein the AESL further comprises a display unit for displaying information related to the product associated with the audio electronic shelf label.

2. The audio electronic labeling system according to claim 1, wherein the AESL further comprises a power source configured for supplying power to one or more components of the AESL.

3. The audio electronic labeling system according to claim 1, wherein the AESL further comprises a memory configured for storing information about the product associated with the AESL.

4. The audio electronic system according to claim 1, wherein the memory is configured to store the authentication code.

5. The audio electronic labeling system according to claim 1, wherein the control unit is configured for matching the authorization code provided by the user device with the authorization code stored in the memory of the AESL, and upon successful matching, the AESL is configured to transmit identity information, price information or information related to the product, the user device.

6. The audio electronic labeling system according to claim 1, wherein the communication interface is configured to receive new authorization code matching an authentication code in the label to replace an old authorization code.

7. An Audio Electronic Shelf Label (AESL) configured for providing information related to a product associated with the audio electronic shelf label, the AESL comprising:

a communication interface for communicating information related to the AESL, and wherein the communication interface is configured to be communicatively coupled to a billing module installed on a POS device, and wherein the billing module is configured for generating a virtual cart associated with the user;

a control unit coupled to the communication interface, and wherein the control unit is configured for processing the information related to the AESL; and an audio interface unit coupled to the control unit, and wherein the audio interface unit is configured for generating audio signals encoded with a characteristic audio tag upon receiving an indication from a user device, and wherein the audio interface unit is encoded with a characteristic audio tag (a proprietary audio tag) by using a proprietary audio library, and wherein the control unit is configured to decode received information to obtain the preset audio data using the proprietary library;

a display unit for displaying information related to the product associated with the audio electronic shelf label.

8. The AESL according to claim 7, further comprises a communication interface and wherein the communication interface is configured to be communicatively coupled to a central server, and wherein the central server is configured for controlling an operation of the AESL.

9. The AESL according to claim 7, wherein the communication interface is configured to be communicatively coupled to an application module installed on a user device associated with a user, and wherein the application module is configured for interfacing the user with the AESL.

10. The AESL according to claim 7, wherein the communication interface is configured to be communicatively coupled to a radio frequency communicator configured for routing information related to the AESL to the central server.

11. The AESL according to claim 7 further comprises a power source configured for supplying power to one or more components of the AESL.

12. The AESL according to claim 7 further comprises a memory configured for storing information about the product associated with the AESL.

13. The AESL according to claim 7, wherein the memory is configured for storing an authentication code, and wherein the central server is configured for allocating an authentication code upon activating the application module installed on the user device.

14. The AESL according to claim 7, wherein the control unit is configured for matching the authorization code provided by the user device with the authorization code stored in the memory, and upon successful matching, and wherein the communication interface is configured to transmit identity information, price information or information related to the product, to the user device.

* * * * *